Feb. 10, 1931.   C. B. HUDSON   1,792,462
TIRE BUILDING DRUM
Filed Aug. 31, 1927   3 Sheets-Sheet 1

INVENTOR.
CHARLES B. HUDSON.
BY
ATTORNEYS.

Feb. 10, 1931.  C. B. HUDSON  1,792,462
TIRE BUILDING DRUM
Filed Aug. 31, 1927  3 Sheets-Sheet 3

INVENTOR.
CHARLES B. HUDSON.
BY
ATTORNEYS.

Patented Feb. 10, 1931

1,792,462

UNITED STATES PATENT OFFICE

CHARLES B. HUDSON, OF AKRON, OHIO, ASSIGNOR TO THE AKRON STANDARD MOLD COMPANY, OF AKRON, OHIO, A CORPORATION OF OHIO

TIRE-BUILDING DRUM

Application filed August 31, 1927. Serial No. 216,603.

This invention relates to collapsible drums for use in the manufacture of tire casings by the so-called "flat band" or drum method, it being the object of the invention to improve upon the mechanism for collapsing and erecting the drum, and particularly to provide mechanism to operate the drum automatically so that faster operation is attainable and the operator is relieved of the work of collapsing and erecting the drum.

Figure 1:
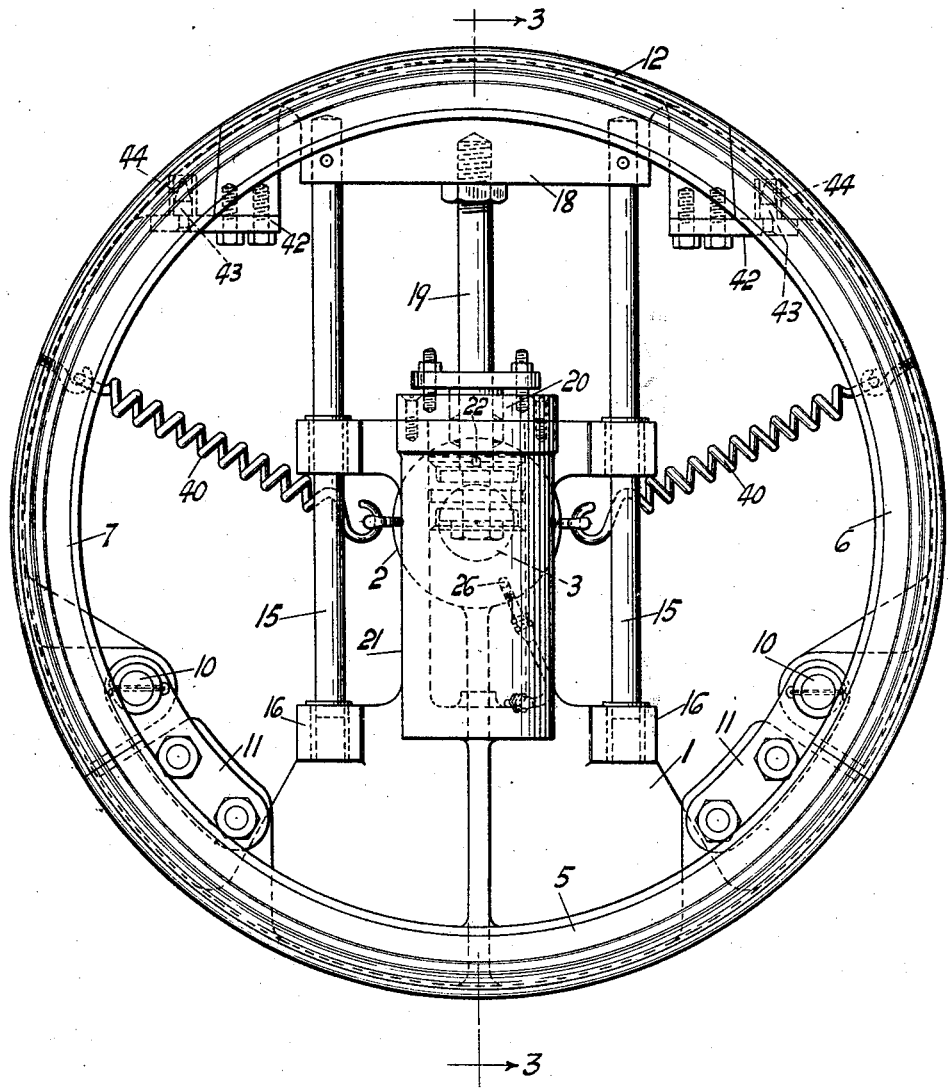
Figure 2:
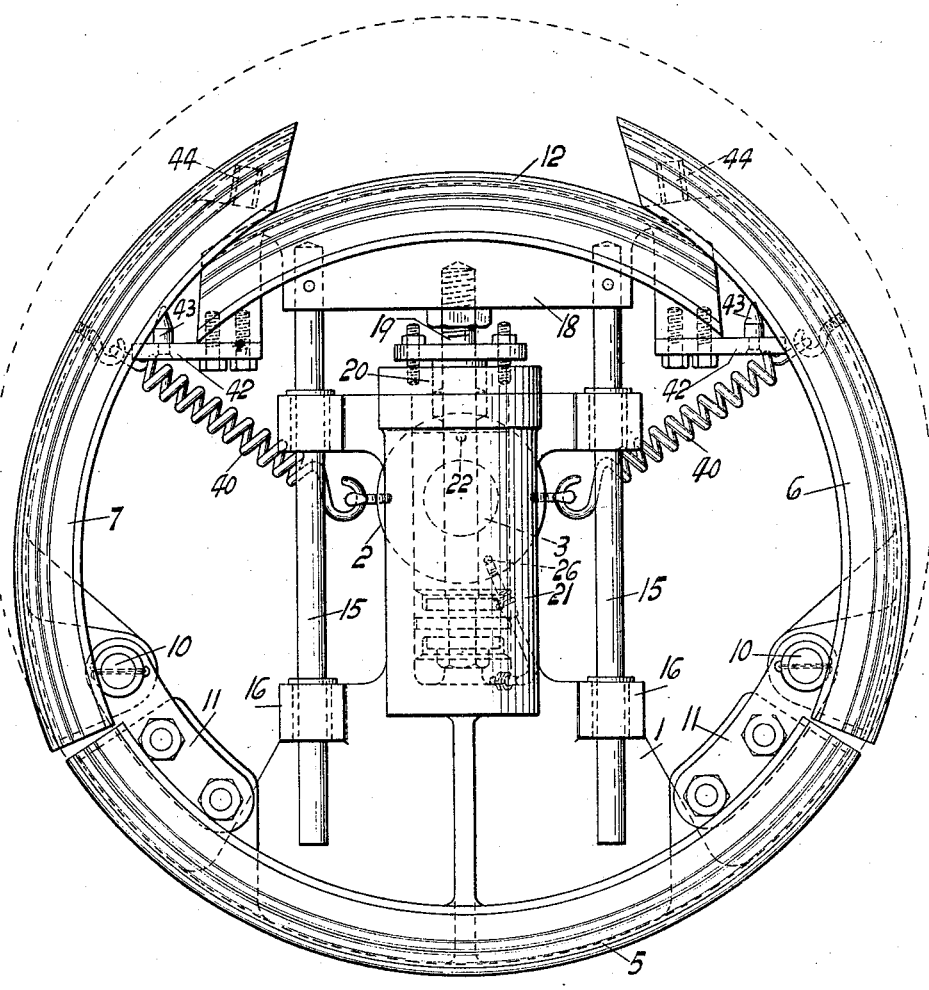
Figure 3:
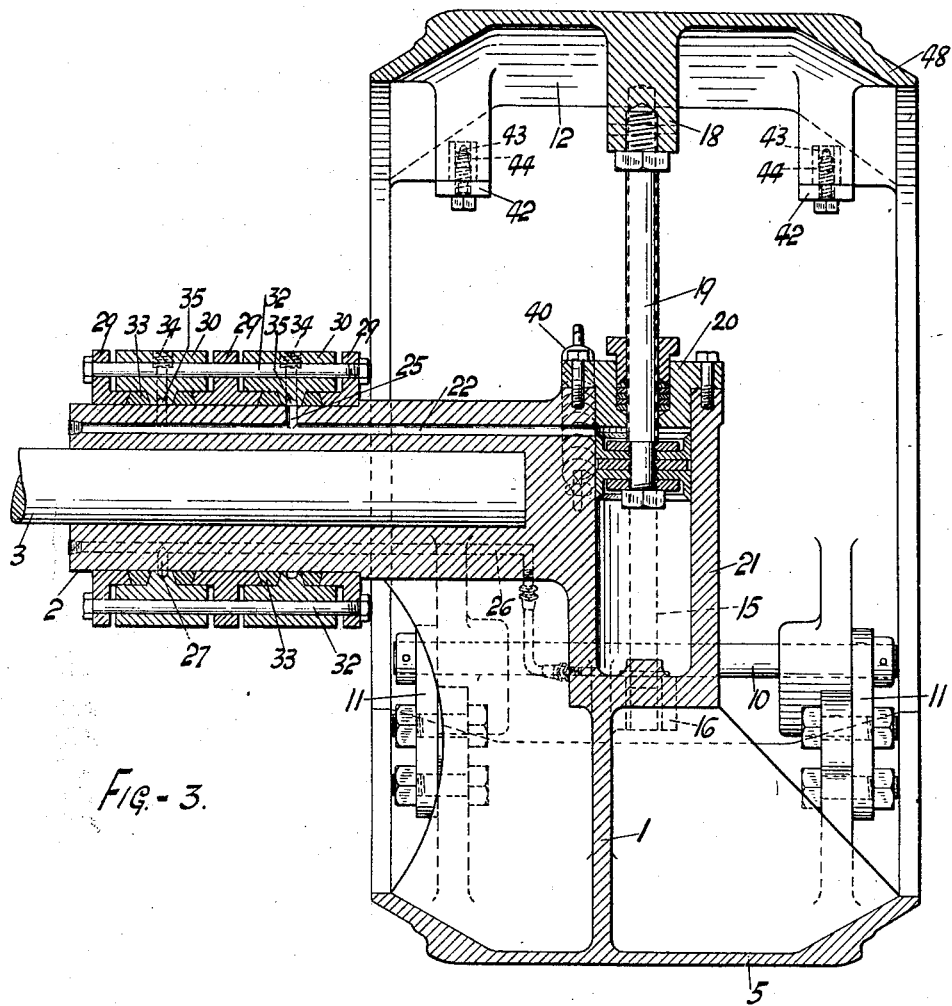

The construction and operation of the invention will be apparent from the description and drawings in which Figure 1 is a side view showing the drum erected and in the condition in which a tire band is to be constructed thereon;

Figure 2 is a similar view showing the drum collapsed for the removal of the finished band; and Figure 3 is a vertical section on the line 3—3 of Figure 1.

The drum comprises a central supporting plate or web 1 which is provided with a laterally extending bearing sleeve 2 adapted to be mounted upon the shaft 3 of the building stand or machine, by which it may be rotated.

Formed as a part of or attached to the central plate 1 is a stationary drum section 5, and at either end of the section are located pivoted drum sections 6 and 7 supported upon and rocked upon hinge pin 10 located in strap 11 at the ends of the section 5.

The sections 5, 6 and 7, together with a separate movable key section 12, constitute the complete tire building drum. This key section is carried upon radial arms or posts 15 which are movable in parallel guideways or sleeves 16 formed on the central plate. The section 12 is formed with a cross-head 18 to which is secured a piston rod 19 which passes through a stuffing box 20 in the end of cylinder 21 formed as a part of the central casting. The cylinder constitutes means for moving the separate key section 12 toward and away from the axis of the core. Fluid pressure is admitted above the piston head by a passageway 22 formed in the bearing sleeve and communicating with the outer surface of the sleeve by a lateral port 25. A similar passageway 26 conducts fluid pressure to the underside of the piston, this second passageway being provided with a lateral port 27 out of alignment with the port 25.

Surrounding the bearing sleeve 2 are located a plurality of spaced stationary arms or webs 29 between which are rings 30, one over the inlet port 25 and the other over the outlet port 27. The elements 29 and 30 are held together by longitudinal clamping bolts 32 and are provided with packing rings 33. Each of the rings is connected to a source of fluid under pressure at 34, which is controlled by the operator at the building machine, and each ring is provided on its inner face with a circumferential groove 35 which is always in communication with its respective inlet port. In this manner the piston for operating the key section is movable at all times under the control of the machine operator.

The swinging sections are connected to the central plate by contractile coil springs 40 so that as the key section is withdrawn, the pivoted sections will move inwardly. The ends of the key section carry plates or wings 42, in the ends of which are fastened dowels 43 adapted to enter holes 44 in the ends of the swinging sections so that as the key section moves outwardly, it will be properly located and centered with respect to the swinging sections, and the entire drum will be rigidly supported and connected.

It will be observed that a very simple and easily operated drum construction has been devised and that the operation of the device is entirely automatic, the key section moving the pivoted sections outwardly as it moves from the position shown in Figure 2 to that shown in Figure 1. As the key section is withdrawn, the pivoted sections move inwardly by the force of the springs to collapsed position.

The drum may be of any desirable contour as dictated by the demands of the tire manufacturer. In the form shown in Figure 3, the main outer surface of the drum is cylindrical, while its edges are provided with inwardly extending flanges 48 forming seats for the tire beads.

What is claimed is:

1. A tire building form having a stationary section and pivoted sections mounted at the ends thereof, a key section located between the ends of the pivoted sections and movable toward and from the axis of the form, a pressure cylinder at the center of the form between the sides thereof and directed radially of the form, and a piston mounted in the cylinder and carrying the key section at its outer end.

2. A tire building form having a stationary section and pivoted sections mounted at the ends thereof, a key section located between the ends of the pivoted sections and movable toward and from the axis of the form, a pressure cylinder at the center of the form between the sides thereof and directed radially of the form, a piston mounted in the cylinder and carrying the key section at its outer end and means to move the pivoted section inwardly upon the withdrawal of the key section toward the axis of the form.

3. A rotatable tire building form having a stationary section and pivoted sections mounted at the ends thereof, a key section located between the ends of the pivoted sections and movable toward and from the axis of the form, a pressure cylinder at the center of the form between the sides thereof and directed radially of the form, a piston mounted in the cylinder and carrying the key section at its outer end, and permanent connections extending through the axis of the form to the cylinder so that fluid pressure may be admitted therein in any position of the drum.

4. A rotatable tire building form having a stationary section and pivoted sections mounted at the ends thereof, a key section located between the ends of the pivoted sections and movable toward and from the axis of the form, a pressure cylinder at the center of the form between the sides thereof and extending radially of the form, a piston mounted in the cylinder and carrying the key section at its outer end, permanent connections through the axis of the form to the cylinder so that fluid pressure may be admitted therein in any position of the drum, and means to lock the key section and the ends of the pivoted sections when the form is in expanded condition.

5. In a collapsible tire building form, the combination of a sectional drum, certain of the sections being movable toward and from the axis of the drum, and a key section located between the ends of the movable section, and means for supporting and moving the key section independently of the other sections comprising a fluid operated cylinder located within the drum and between the sides thereof and extending radially of the drum and a piston in said cylinder to which the key section is attached.

6. A rotatable collapsible drum comprising movable sections, one of which is a key section, means for guiding the key section for movement toward and from the axis of the drum, and means to operate the key section comprising a pressure cylinder positioned radially between the sides of the drum and connections to the pressure cylinder through the axis of the drum so as to be operable in any position of the drum.

7. A rotatable collapsible drum comprising movable sections, one of which is a key section, means for guiding the key section for movement toward and from the axis of the drum, means to operate the key section comprising a pressure cylinder arranged radially between the sides of the drum and connections to the pressure cylinder operable in any position of the drum, and means to move the remaining drum sections after the inward movement of the key section.

CHARLES B. HUDSON.